(12) United States Patent  
Takahashi et al.

(10) Patent No.: US 8,118,560 B2
(45) Date of Patent: Feb. 21, 2012

(54) BLADE

(75) Inventors: Akira Takahashi, Tokyo (JP); Yukie Sasaki, Tokyo (JP); Haruyuki Tanimitsu, Tokyo (JP); Hiroshi Hamazaki, Tokyo (JP)

(73) Assignee: IHI Corporation (JP)

( * ) Notice: Subject to any disclaimer, the term of this patent is extended or adjusted under 35 U.S.C. 154(b) by 640 days.

(21) Appl. No.: 12/297,256

(22) PCT Filed: Apr. 6, 2007

(86) PCT No.: PCT/JP2007/057756
§ 371 (c)(1),
(2), (4) Date: Oct. 15, 2008

(87) PCT Pub. No.: WO2007/119696
PCT Pub. Date: Oct. 25, 2007

(65) Prior Publication Data
US 2009/0136354 A1 May 28, 2009

(30) Foreign Application Priority Data
Apr. 17, 2006 (JP) ................... 2006-113537

(51) Int. Cl.
*B63H 1/26* (2006.01)
*B63H 7/02* (2006.01)
(52) U.S. Cl. .................. 416/236 R; 416/235; 415/914
(58) Field of Classification Search .................. 416/235, 416/236 R; 415/914
See application file for complete search history.

(56) References Cited

U.S. PATENT DOCUMENTS

| 3,000,401 | A | 1/1960 | Ringleb | |
| 4,822,249 | A | 4/1989 | Eckardt et al. | |
| 7,685,713 | B2 * | 3/2010 | McKeever | 29/889.7 |
| 2005/0214113 | A1 | 9/2005 | Johann | 415/181 |

FOREIGN PATENT DOCUMENTS

| EP | 1 081 332 | 3/2001 |
| GB | 750305 | 6/1956 |
| GB | 2032048 A | 4/1980 |
| JP | 56-66494 | 6/1981 |
| JP | 02-001962 B2 | 1/1990 |
| JP | 07-011901 A | 1/1995 |
| JP | 8-296402 | 11/1996 |
| JP | 2000-104501 | 4/2000 |

(Continued)

OTHER PUBLICATIONS

Office Action dated Jan. 4, 2011 issued in corresponding Japanese Application No. 2008-510941 with English translation (5 pages).
K. Rouser et al., "Effect of Dimples on Boundary Layer Separation on a Low Pressure Turbine Blade" ISABE-2003-1097, pp. 1-23.

(Continued)

*Primary Examiner* — Michelle Estrada
(74) *Attorney, Agent, or Firm* — Ostrolenk Faber LLP (57) ABSTRACT

A blade surrounded by: a leading edge portion, which is where fluid flows in; a pressure surface which is a concave curve shape concaved along a direction the fluid flows; a suction surface which is a convex curve shape convexed along a direction the fluid flows; and a trailing edge portion, which is where the fluid flows out, in which a disturbance addition portion is provided on the suction surface closer to the leading edge portion than a maximum velocity point, where the flow velocity of the fluid is maximized on the suction surface, for disturbing a laminar flow on the suction surface and for transitioning to a turbulent flow.

1 Claim, 11 Drawing Sheets

FOREIGN PATENT DOCUMENTS

| | | |
|---|---|---|
| JP | 2000-337101 A | 12/2000 |
| JP | 2001-32796 | 2/2001 |
| JP | 2002-21502 | 1/2002 |

OTHER PUBLICATIONS

International Search Report dated Jun. 19, 2007, issued in corresponding international application No. PCT/JP2007/057756.

* cited by examiner

BLADE

CROSS REFERENCE TO RELATED APPLICATIONS

The present application is a 35 U.S.C. §371 National Phase conversion of PCT/JP2007/057756, filed Apr. 6, 2007, which claims benefit of Japanese Application No. 2006-113537, filed Apr. 17, 2006, the disclosure of which is incorporated herein by reference. The PCT International Application was published in the Japanese language.

TECHNICAL FIELD

The present invention relates to a blade used by gas turbines, blowers, or the like.

BACKGROUND ART

Generally, a blade used by gas turbines, blowers, or the like is configured so as to be surrounded by: a leading edge portion, which is where the fluid flows in; a pressure surface which is a concave curve shape concaved along a direction the fluid flows; a suction surface which is a convex curve shape convexed along a direction the fluid flows; and a trailing edge portion, which is where the fluid flows out. Conventionally, as shown in Japanese Unexamined Patent Applications, First Publication Nos. 2002-21502 and 2000-104501, for example, improvement of efficiency, performance, or blowing performance of turbines has been intended or generation of noise has been prevented by preventing a boundary layer of the fluid flowing on the suction surface from separating at the trailing edge portion. This is known as a laminar separation.

Here, in a case in which the blade is used under a high altitude condition, such as in an aircraft engine, the above-described laminar separation easily occurs since the Reynolds number decreases at the trailing edge portion of the suction surface.

DISCLOSURE OF THE INVENTION

Problem to be Solved by the Invention

However, the conventional blade has a problem in that it is not possible to effectively prevent the laminar separation.

That is, Japanese Unexamined Patent Application, First Publication No. 2002-21502 proposes a blade provided with a slit wall formed so as to extend in a blade chord direction of the blade at the trailing edge portion on the suction surface. In this case, since the slit wall is formed in a location which is closer to the trailing edge portion than a maximum velocity point where the flow velocity of the fluid flowing in on the suction surface is maximized on the suction surface, the laminar separation easily occurs. Accordingly, when the fluid is already causing the laminar separation at the time when the fluid reaches the slit wall, even if the slit wall is formed, it is difficult to return the separation to a laminar flow.

Japanese Unexamined Patent Application, First Publication No. 2000-104501 proposes a blade whose average surface roughness is larger at the leading edge portion than the suction surface so as to cause a turbulent flow at the leading edge portion. It is difficult to realize the surface roughness described in paragraph [0015] of Japanese Unexamined Patent Application, First Publication No. 2000-104501 from a manufacturing point of view.

The present invention was made in view of the above-described circumstances. An object of the invention is to provide a blade for preventing the laminar separation from occurring at the trailing edge portion of the suction surface of the blade without causing manufacturing problems.

Means for Solving the Problem

In order to solve these problems to achieve the object, a blade in accordance with the present invention is surrounded by: a leading edge portion, which is where fluid flows in; a pressure surface which is a concave curve shape concaved along a direction the fluid flows; a suction surface which is a convex curve shape convexed along a direction the fluid flows; and a trailing edge portion, which is where the fluid flows out, in which a disturbance addition portion is provided on the suction surface closer to the leading edge portion than a maximum velocity point, where the flow velocity of the fluid is maximized on the suction surface, for disturbing a laminar flow on the suction surface and for transitioning to a turbulent flow.

In accordance with the invention, since the disturbance addition portion is provided on the suction surface, when the fluid flowing in from the leading edge portion reaches the disturbance addition portion, it is possible to disturb the laminar flow located closer to the leading edge portion than the disturbance addition portion on the suction surface at the disturbance addition portion so as to transition to the turbulent flow on the suction surface located closer to the trailing edge portion than the disturbance addition portion.

Accordingly, it is possible to prevent the fluid from causing the laminar separation on the suction surface located closer to the leading edge portion than the disturbance addition portion.

Here, the disturbance addition portion is concaved in a thickness direction of the blade formed by the pressure surface and the suction surface and is formed in a step portion extending along the direction the fluid flows. On the suction surface, a first suction surface located in the leading edge portion and a second suction surface located in the trailing edge portion are connected via the step portion. The second suction surface may be located closer to the pressure surface than an imaginary curve which is made when the first suction surface is extended to the trailing edge portion along the second suction surface.

In this case, the suction surface is provided with the first suction surface and the second suction surface and the first suction surface and the second suction surface are connected via the step portion. Accordingly, when the fluid flowing in from the leading edge portion flows over the first suction surface, reaches the disturbance addition portion, and moves toward the second suction surface, by rapidly decelerating the fluid after rapidly accelerating the fluid at the step portion, which is the disturbance addition portion, it is possible to disturb the laminar flow on the first suction surface on the second suction surface and to transition to the turbulent flow.

Furthermore, the disturbance addition portion is formed to be the step portion extending along the direction in which the fluid flows and is continued to the second suction surface. Accordingly, it is possible to prevent a part of the fluid passing the disturbance addition portion from remaining stagnant therein; it is possible to make the fluid smoothly flow on the second suction surface in the turbulent flow state after the transition. Therefore, it is possible to control the amount of energy loss due to the transition from the laminar flow to the turbulent flow to the minimum level.

Accordingly, it is possible to reliably prevent the fluid from causing the laminar separation in the trailing edge portion of the suction surface.

Furthermore, the suction surface is formed such that the first suction surface and the second suction surface are connected via the step portion. Accordingly, it is possible to decrease restrictions in manufacturing conditions compared to cases in which the average surface roughness is differentiated at different portions on the blade or concavo-convex shapes are provided on the suction surface to prevent the laminar separation of the fluid from occurring as described in Japanese Unexamined Patent Applications, First Publication No. 2000-104501 for example.

EFFECT OF THE INVENTION

In accordance with the blade of the present invention, it is possible to prevent the laminar separation from occurring at the trailing edge portion of the suction surface without causing restrictions in the manufacturing conditions.

BEST MODE FOR CARRYING OUT THE INVENTION

Figure 2:
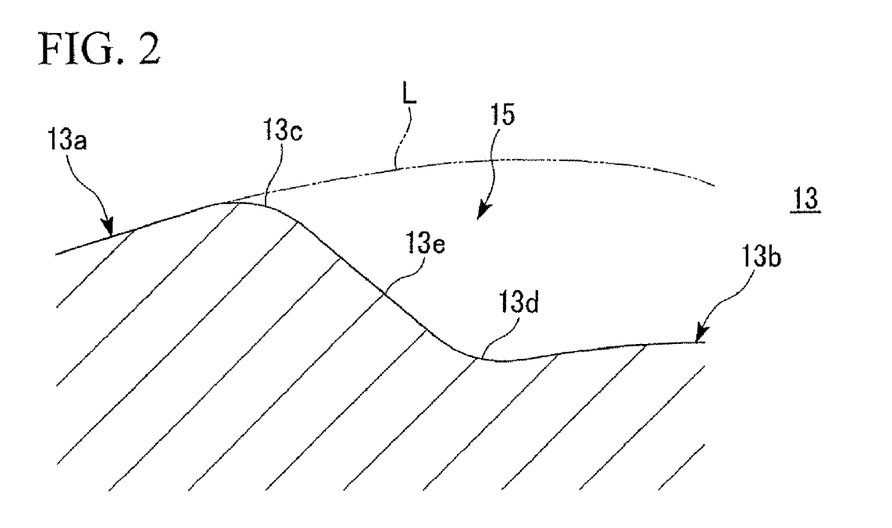
FIG. 2 is an enlarged view of an A part of the blade shown in FIG. 1.
Figure 3:
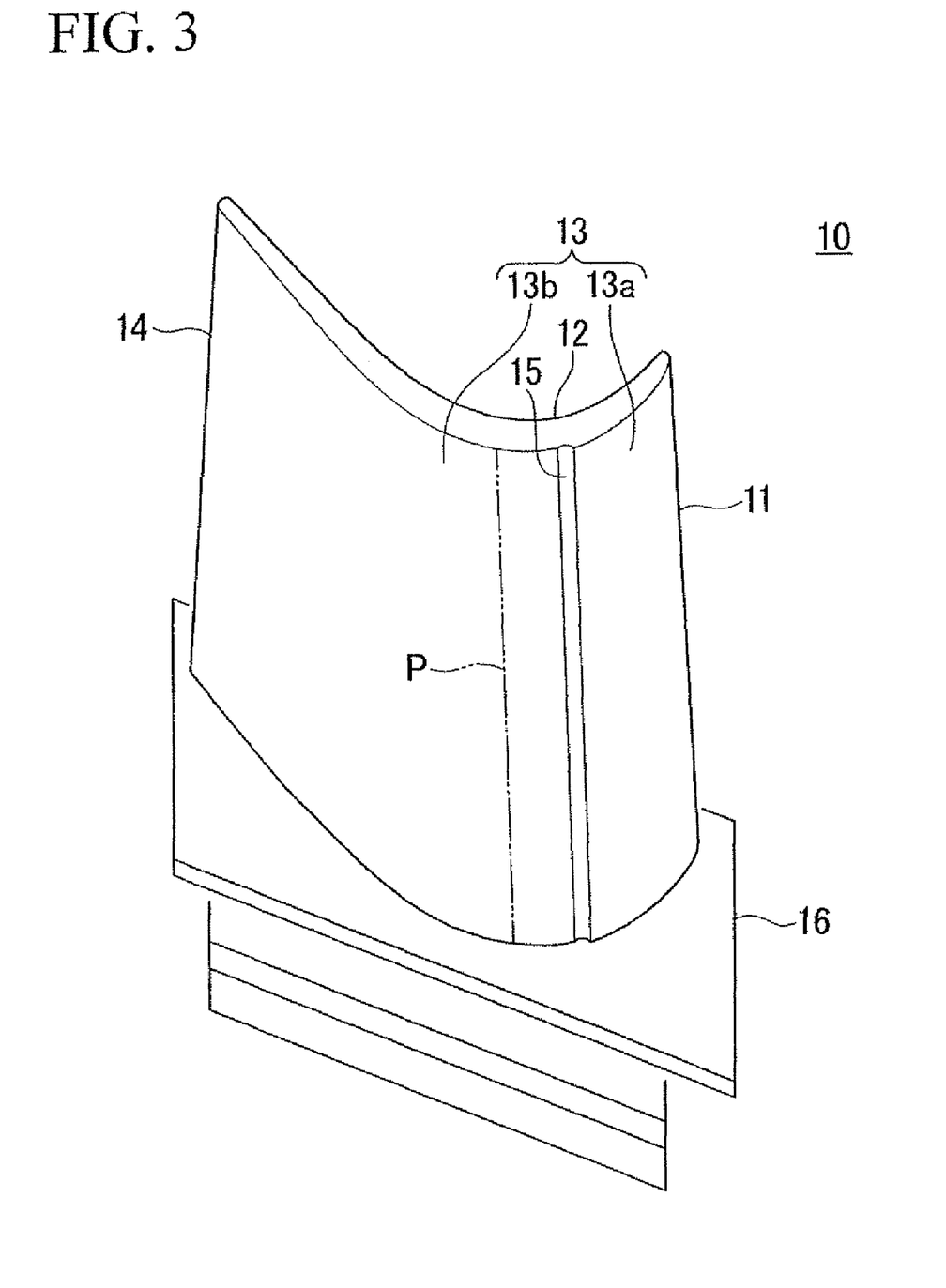
FIG. 3 is a perspective view of the blade shown in FIG. 1.
Figure 4:
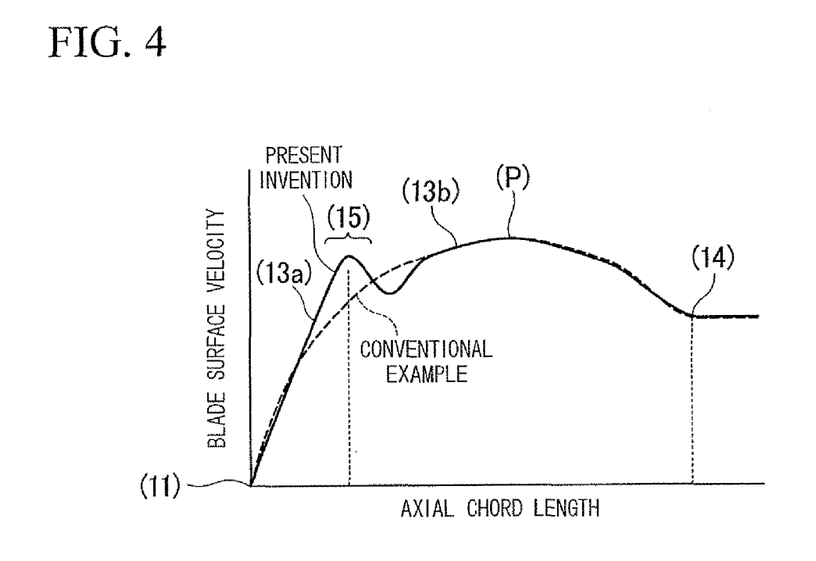
FIG. 4 is a graph showing a blade surface velocity relative to an axial chord length of a fluid passing on the suction surface of the blade shown in FIGS. 1 to 3 and a conventional blade example of the present invention.

An Embodiment of the present invention shall be described with reference to FIGS. 1 to 3.

Figure 1:
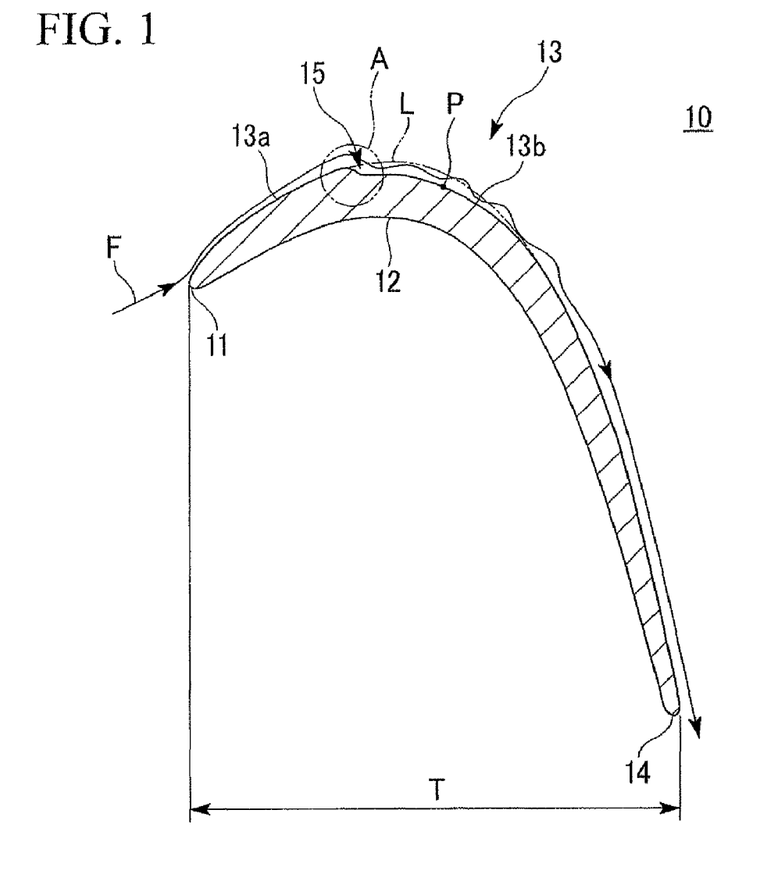
FIG. 1 is a cross sectional view of a blade shown as an embodiment of the present invention.

As shown in FIG. 1, a blade 10 in accordance with the present embodiment is configured so as to be surrounded by: a leading edge portion 11, which is where fluid F flows in; a pressure surface 12 which is a concave curve shape concaved along a direction the fluid F flows; a suction surface 13 which is a convex curve shape convexed along a direction the fluid F flows; and a trailing edge portion 14, which is where the fluid F flows out. Here, in the present embodiment, the blade 10 is a turbine blade. As shown in FIG. 3, a mounting stage 16 for mounting the turbine blade on a main body of the turbine (not shown) is provided on a side surface of the blade 10.

A disturbance addition portion 15 is provided on the suction surface 13 closer to the leading edge portion 11 than a maximum velocity point P, where the flow velocity of the fluid F is maximized on the suction surface 13, for disturbing a laminar flow on the suction surface 13 and for transitioning to the turbulent flow. The disturbance addition portion 15 of the present embodiment is concaved in a thickness direction of the blade 10 formed by the pressure surface 12 and the suction surface 13 and is formed in a step portion extending along the direction the fluid F flows. On the suction surface 13, a first suction surface 13a extending from the leading edge portion 11 and a second suction surface 13b extending from the trailing edge portion 14 are connected via the step portion.

The second suction surface 13b is located closer to the pressure surface 12 than an imaginary curve L which is made when the first suction surface 13a is extended to the trailing edge portion 14 over the second suction surface 13b.

The disturbance addition portion 15 is provided so as to extend in a blade height direction, that is, a direction perpendicular to a direction the fluid F flows on the suction surface 13. The disturbance addition portion 15 is provided so as to extend over the whole area in the blade height direction on the suction surface 13. Here, the maximum velocity point P is generally located in the vicinity of a throat portion of the blade 10.

The disturbance addition portion 15 is configured so that a connection portion 13c with the first suction surface 13a is a convex curve shape convexed along the flow direction of the fluid F and a connection portion 13d with the second suction surface 13b is a concave curve shape concaved along the flow direction of the fluid F. An inclined surface 13e extending along the flow direction of the fluid F is configured between the connection portions 13c and 13d. Here, an inclination angle θ of the inclined surface 13e relative to the first suction surface 13a is set so as not to allow a part of the fluid F to remain stagnant at the disturbance addition portion 15 or so as to allow fluid F to transition from the laminar flow to the turbulent flow on the second suction surface 13b.

In the above-described configuration, when the fluid F flowing in from the leading edge portion 11 onto the suction surface 13 reaches the disturbance addition portion 15, the velocity thereof is rapidly accelerated by the convex curve shape of the connection portion 13c with the first suction surface 13a and the inclined shape of the inclined surface 13e. Thereafter, when the fluid F reaches the connection portion 13d with the second suction surface 13b, the velocity thereof is rapidly decelerated by the concave curve shape of the connection portion 13d.

In this manner, the fluid F passing through the disturbance addition portion 15 smoothly flows onto the second suction surface 13b by the convex curve shape of the connection portion 13d with the second suction surface 13b. At this moment, by the rapid acceleration and deceleration, the fluid F flowing onto the second suction surface 13b transitions to the turbulent flow with the laminar flow on the first suction surface 13a being disturbed.

As described above, in accordance with the blade 10 of the present embodiment, the suction surface 13 has the first suction surface 13*a* and the second suction surface 13*b*, and the first suction surface 13*a* and the second suction surface 13*b* are connected via the step portion which is the disturbance addition portion 15. When the fluid F flowing in from the leading edge portion 11 and flowing onto the first suction surface 13*a* reaches disturbance addition portion 15 and moves toward the second suction surface 13*b* by rapidly decelerating the fluid F after rapidly accelerating the fluid F in the disturbance addition portion 15, it is possible to disturb the laminar flow on the first suction surface 13*a* and transition to the turbulent flow on the second suction surface 13*b*.

Furthermore, the disturbance addition portion 15 is configured to be a step portion so as to be extended along the flow direction of the fluid F and is continued to the second suction surface 13*b*. Accordingly, it is possible to prevent the part of the fluid F passing through the disturbance addition portion 15 from remaining stagnant in the disturbance addition portion 15; thereby, it is possible to make the fluid F smoothly flow onto the second suction surface 13*b* in the turbulent flow state after the transition. Therefore, it is possible to control the amount of energy loss due to the transition from the laminar flow to the turbulent flow in the minimum level.

Accordingly, it is possible to reliably prevent the fluid from causing the laminar separation in the trailing edge portion 14 on the suction surface 13.

Furthermore, by providing the step portion, which is the disturbance addition portion 15, on the suction surface 13 to provide the first suction surface 13*a* and the second suction surface 13*b*, it is possible to decrease restrictions in manufacturing conditions compared to cases in which the average surface roughness is differentiated at different portions on the blade or concavo-convex shapes are provided on the suction surface to prevent the laminar separation of the fluid from occurring as described in Japanese Unexamined Patent Application, First Publication No. 2000-104501 for example.

In particular, when the blade 10 is made by casting, for example, a Lost wax casting process, together with the disturbance addition portion 15 to be provided so as to extend over the whole area in the blade height direction on the suction surface 13, such restrictions in manufacturing conditions can be further reliably decreased.

The technical scope of the present invention is not limited to the embodiment described above but various changes and modification are possible provided they do not depart from the gist of the present invention.

For example, in the embodiment, although the connection portion 13*c* between the disturbance addition portion 15 and the first suction surface 13*a* is formed as the convex curve shape and the connection portion 13*d* between the disturbance addition portion 15 and the second suction surface 13*b* is formed as the concave curve shape, they can be formed as an angled portion. In this case as well, substantially the same effect as described above can be obtained. Also, the blade in the present invention can be applied both to a rotor blade and a guide vane.

Next, the embodiment of the blade 10 in accordance with the present invention shall be described in further detail.

Figure 5A:
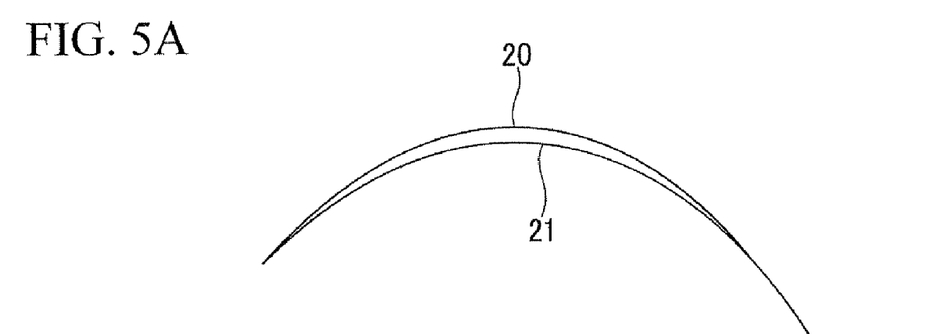
FIG. 5A shows a design method of the blade in accordance with the embodiment of the present invention.
Figure 5B:
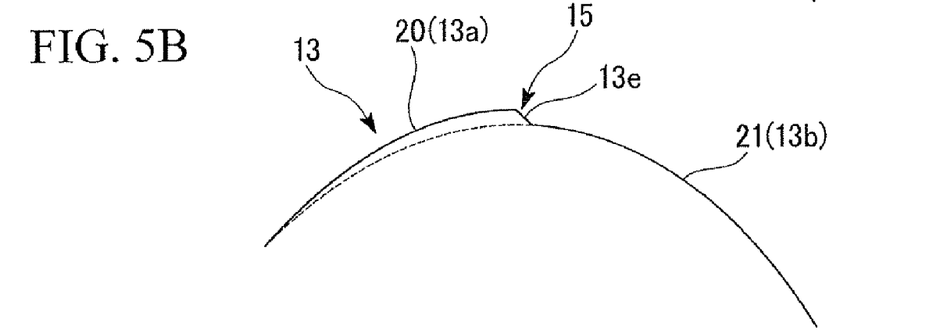
FIG. 5B shows a design method of the blade in accordance with the embodiment of the present invention.

FIGS. 5A to 5B show a design method (overview of the manufacturing method) of the blade 10 in accordance with the embodiment of the present invention, in particular, a design method for the suction surface 13 of the blade 10.

As shown in FIG. 5A, a conventional airfoil (original airfoil) 21 and a modified airfoil 20, which has a modified figure relative to the conventional airfoil 21 with a larger curvature than the conventional airfoil 2T, are prepared. The modified airfoil 20 is overlapped by the conventional airfoil 21.

As shown in FIG. 5B, a rear portion of the modified airfoil 20 is deleted. By the rear portion being deleted and a posterior end of the modified airfoil 20 and the conventional airfoil 21 being connected by a connection portion, which is the inclined surface 13*e* of the disturbance addition portion 15, the suction surface 13 of the blade 10 in accordance with the embodiment of the present invention is designed. Accordingly, the modified airfoil 20 becomes the first suction surface 13*a* and the conventional airfoil 21 becomes the second suction surface 13*b*.

Figure 5C:
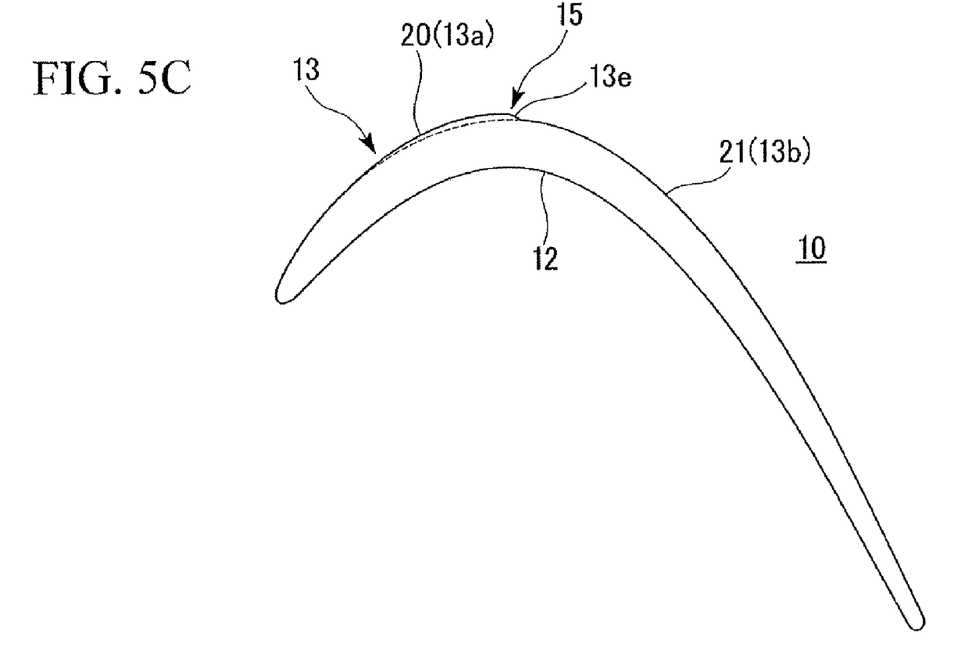
FIG. 5C shows the blade in accordance with the embodiment of the present invention.

The blade 10 in accordance with the embodiment of the present invention designed in this manner is configured such that, as shown in FIG. 5C, the pressure surface 12 is the conventional airfoil (original airfoil) and a fore portion (the first suction surface 13*a*) of the suction surface 13 is the modified airfoil 20 and the rear portion (second suction surface 13*b*) of the suction surface 13 is the conventional airfoil 21. In the suction surface, the modified airfoil 20 in the fore side and the conventional airfoil 21 in the rear side are connected by the inclined surface 13*e* which is the connection portion.

The fluid F flow around a blade 100 in accordance with a conventional example and the blade 10 in accordance with the embodiment of the present invention shall be described with reference to FIGS. 6 and 7.

Figures 6, 7:
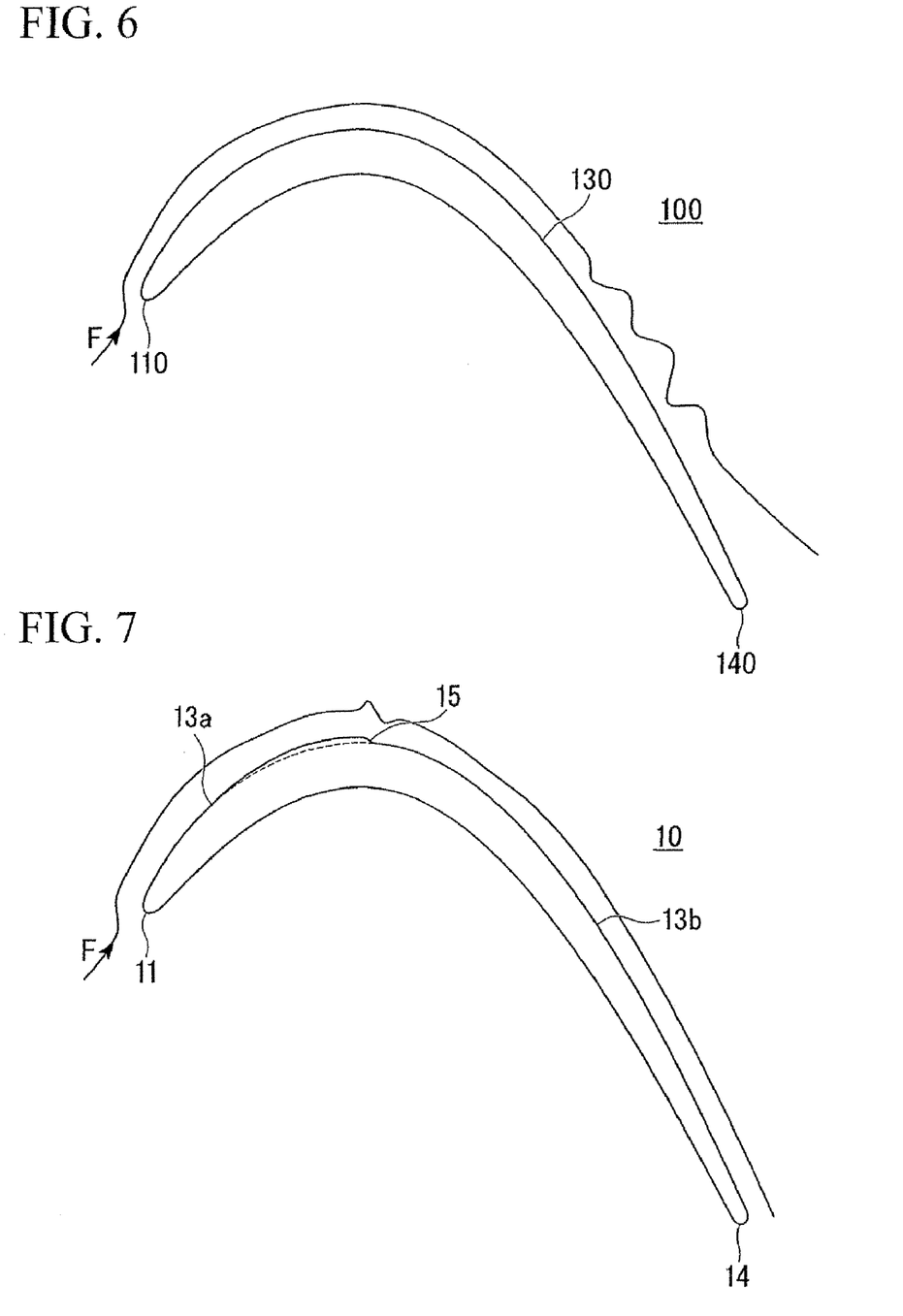
FIG. 6 shows fluid flow around the blade in accordance with the conventional example.
FIG. 7 shows the fluid flow around the blade in accordance with the embodiment of the present invention.

FIG. 6 shows the fluid F flow around the blade 100 (original airfoil) in accordance with the conventional example. As obtained from FIG. 6, in the case of the blade 100 in accordance with the conventional example, the fluid F, flowing in from a leading edge portion 110 onto a suction surface 130, causes a laminar separation, which is a phenomenon where the boundary layer separates in a trailing edge portion 140.

On the other hand, FIG. 7 shows the fluid F flow around the blade 10 in accordance with the embodiment of the present invention. As obtained from FIG. 7, in the case of the blade 10 in accordance with the embodiment of the present invention, when the fluid F flows in from the leading edge portion 11, flows onto the first suction surface 13*a*, reaches the disturbance addition portion 15, and moves toward the second suction surface 13*b*, the fluid F is rapidly decelerated after being rapidly accelerated in the step portion, which is the disturbance addition portion 15. On the second suction surface 13*b*, the laminar flow on the first suction surface 13*a* is disturbed and transitions to the turbulent flow and flows onto the trailing edge portion 14. Therefore, with the blade 10 in accordance with the embodiment of the present invention, the laminar separation does not occur in the fluid F on the trailing edge portion 14.

Next, a specific configuration of the disturbance addition portion 15 of the blade 10 in accordance with the embodiment of the present invention shall be described with reference to FIGS. 8A to 8C and 9.

Figure 8A:
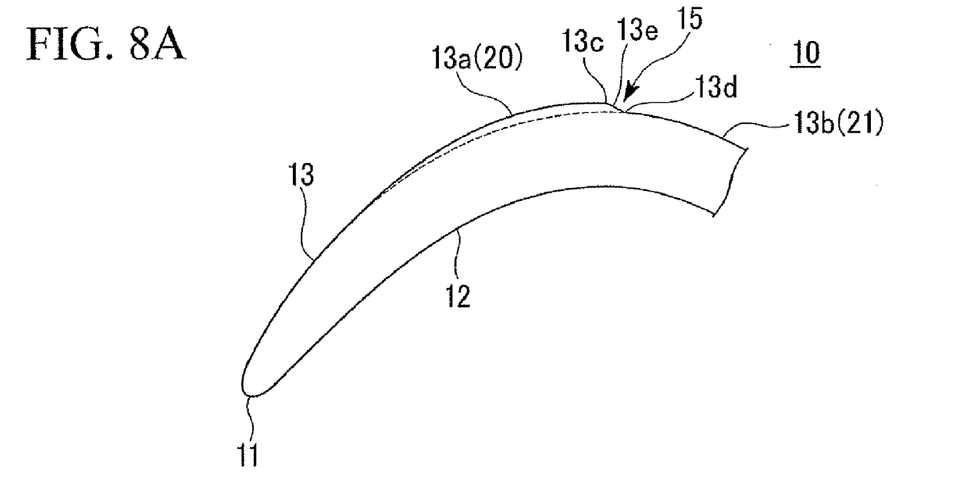
FIG. 8A is a partially enlarged view of the blade in accordance with the embodiment of the present invention.

FIG. 8A is a partially enlarged view showing a portion of the blade 10 from the leading edge portion 11 to the disturbance addition portion 15 of the blade 10 in accordance with the embodiment of the present invention.

As shown in FIG. 8A, in the blade 10 in accordance with the embodiment of the present invention, the pressure surface 12 is the conventional airfoil (original airfoil) and the fore portion (the first suction surface 13*a*) continued from the leading edge portion 11 of the suction surface 13 is the modified airfoil 20 and the rear portion (second suction surface 13*b*) of the suction surface 13 is the conventional airfoil 21. In the suction surface, the modified airfoil 20 in the fore side and the original airfoil 21 in the rear side are connected by the inclined surface 13*e* which is the connection portion.

Figure 8B:
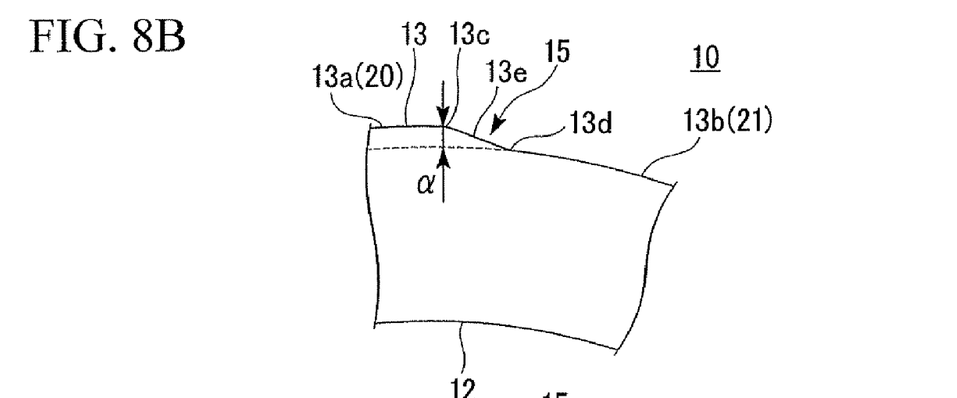
FIG. 8B shows a gap height in the blade in accordance with the embodiment of the present invention.

FIG. 8B shows a gap height a (gap amount, height of the disturbance addition portion) of the blade 10 in accordance with the embodiment of the present invention. The gap height α is a distance between the modified airfoil 20 on the fore side of the suction surface 13 (first suction surface 13a) and the conventional airfoil 21 (second suction surface 13b) when a line is drawn perpendicularly from the modified airfoil 20 on the fore side of the suction surface 13 (first suction surface 13a), at the point where the suction surface 13a intersects with the connection portion 13c, to the conventional airfoil 21 (second suction surface 13b) The gap height α as defined above is defined as 0.1% to 10.0% relative to an actual chord length R which is described later.

Figure 9:
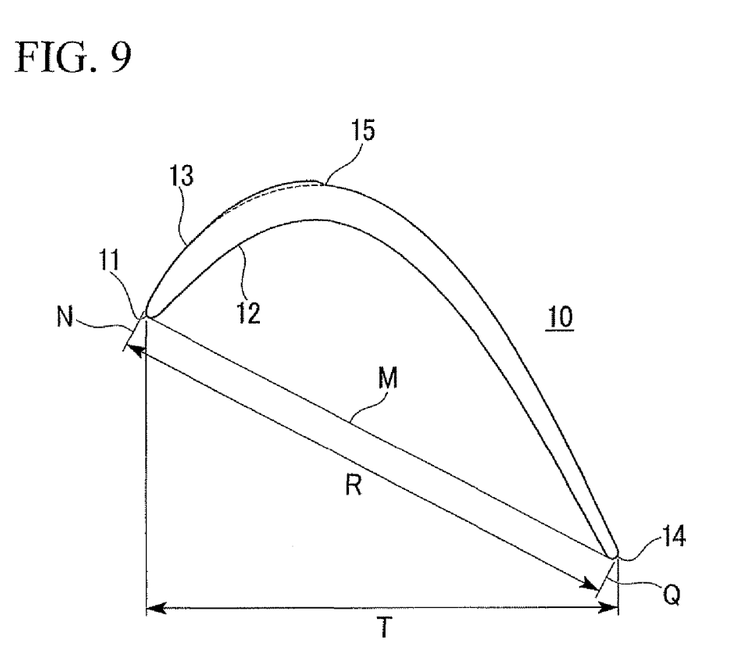
FIG. 9 shows a definition of an actual chord length in the blade in accordance with the embodiment of the present invention.

Here, the actual chord length R shall be defined as below.

As shown in FIG. 9, the actual chord length R is a distance between a line N and a line Q, which are tangent to the leading edge portion 11 and the trailing edge portion 14 respectively, and are among a plurality of lines perpendicular to a tangential line M connecting the leading edge portion 11 and the trailing edge portion 14.

Figure 8C:
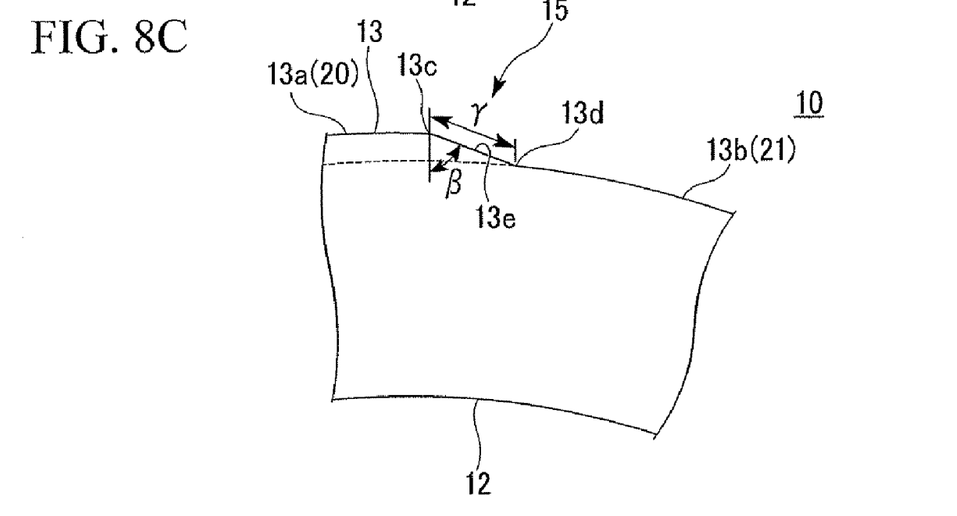
FIG. 8C shows a gap angle and a gap length in the blade in accordance with the embodiment of the present invention.

FIG. 8C shows a gap angle β (inclined surface angle) and a gap length γ (inclined surface length) of the blade 10 in accordance with the embodiment of the present invention.

The gap angle β is an angle between the inclined surface 13e and a vertical line drawn perpendicularly to first suction surface 13a at a point where first suction surface 13a intersect with connection portion 13c. The gap angle β is set between 20° to 85° in order not to allow a part of the fluid to remain stagnant in the disturbance addition portion 15 and to permit the fluid to transition from the laminar flow to the turbulent flow on the second suction surface 13b.

The gap length γ is a length of the inclined surface 13e between the intersection of connection portion 13c with the inclined surface 13e and the intersection of connection portion 13d with the inclined surface 13e. That is, the gap length γ is the length of the inclined surface 13e. The gap length γ is set to 0.2% to 20% relative to the whole length of the blade 10 along the suction surface 13 from a leading end of the leading edge portion 11 to a posterior end of the trailing edge portion 14.

Next, a verification test is performed relative to a blade surface velocity and a blade surface static pressure on the suction surface 13 of the blade 10 in accordance with the embodiment of the present invention. A description shall be made with reference to FIGS. 10 and 11 by comparing the blade 10 in accordance with the embodiment of the present invention and the blade in accordance with the conventional example.

Figure 10:
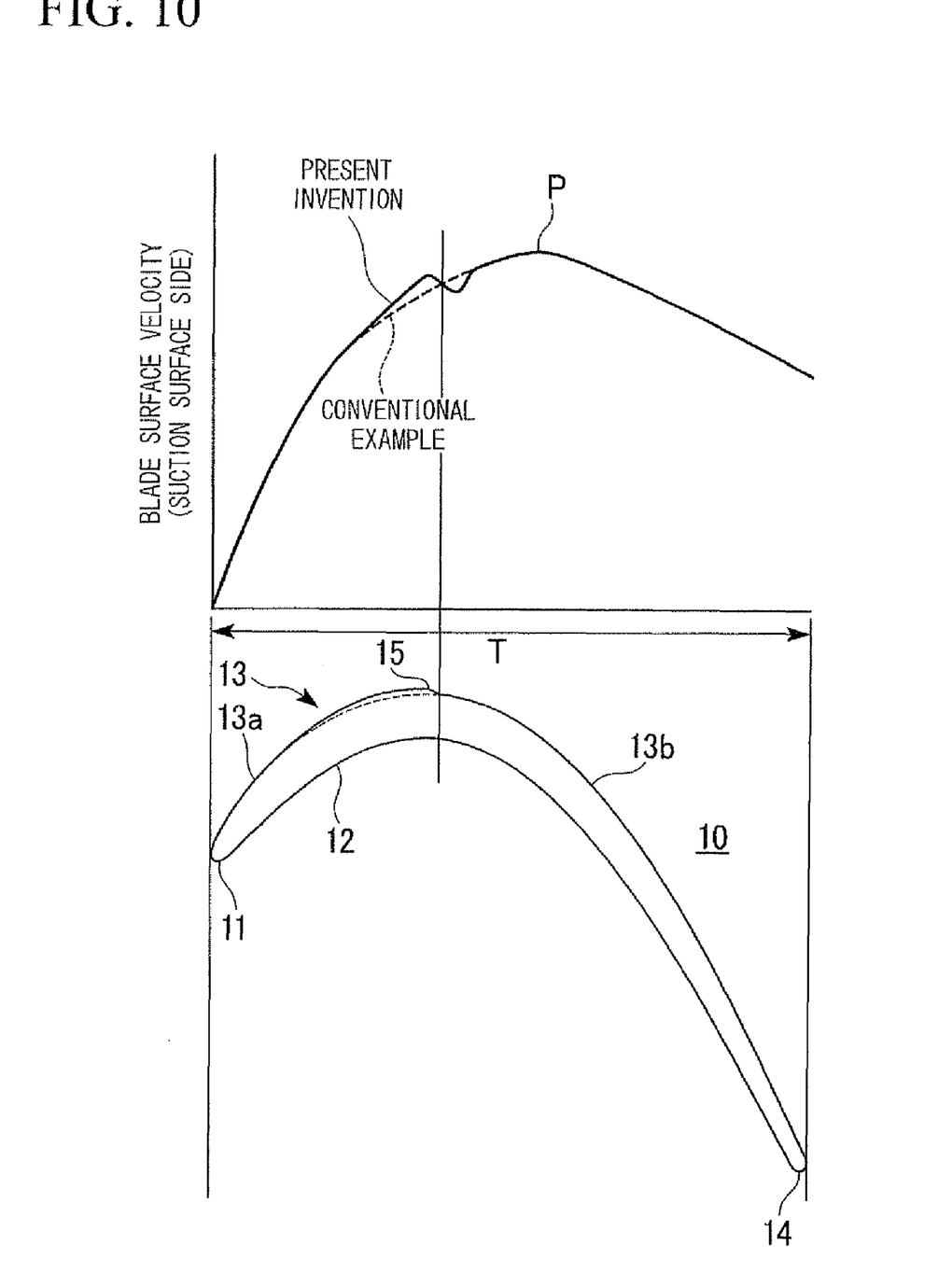
FIG. 10 shows a blade surface velocity in the blade in accordance with the embodiment of the present invention and in accordance with the blade in the conventional example.

As shown in FIG. 10, in the blade 10 in accordance with the embodiment of the present invention, a disturbance addition portion 15 is provided on the suction surface 13 closer to the leading edge portion 11 than a maximum velocity point P, where the flow velocity of the fluid is maximized on the suction surface 13, for disturbing a laminar flow on the suction surface 13 and for transitioning to a turbulent flow.

Accordingly, when the fluid flowing in from the leading edge portion 11 flows onto the first suction surface 13a, reaches the disturbance addition portion 15, and moves toward the second suction surface 13b, the fluid flowing onto the suction surface 13 is rapidly decelerated after being rapidly accelerated in the step portion, which is the disturbance addition portion 15, located closer to the leading edge portion 11 than a maximum velocity point P.

Figure 11:
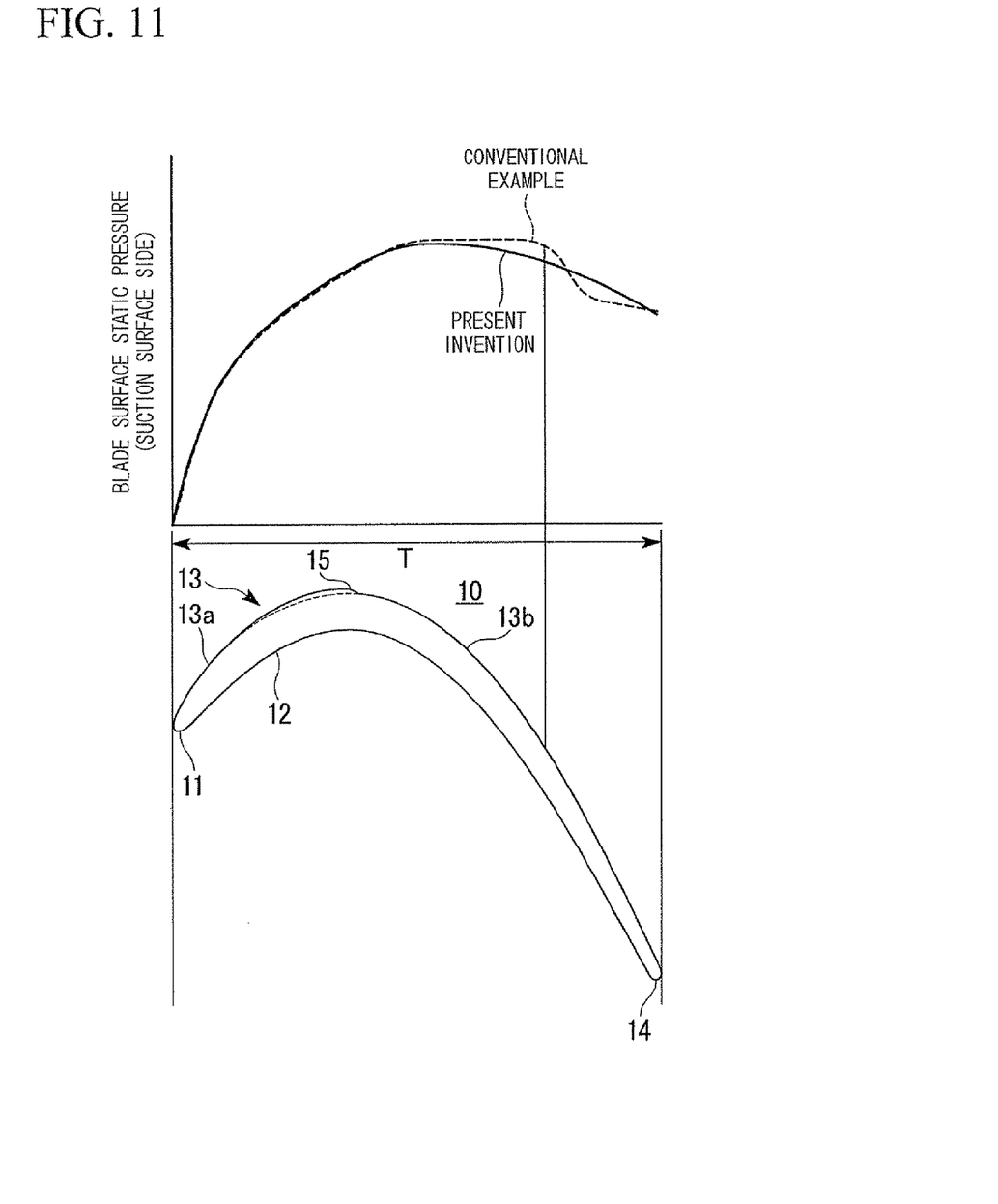
FIG. 11 shows a blade surface static pressure in the blade in accordance with the embodiment of the present invention and in accordance with the blade in the conventional example.

Also, as obtained from FIG. 11, in the blade in accordance with the conventional example, when the laminar separation or a reattachment of the fluid is caused on the second suction surface, the static pressure changes rapidly. On the other hand, in the blade 10 in accordance with the embodiment of the present invention, since the laminar separation of the fluid is not caused even on the second suction surface 13b, it is understood that the static pressure changes smoothly.

Next, a verification test is performed relative to an improvement effect on a turbine loss in the blade 10 in accordance with the embodiment of the present invention. A description shall be made with reference to FIGS. 12 and 13 by comparing to the blade in accordance with the conventional example.

Figure 12:
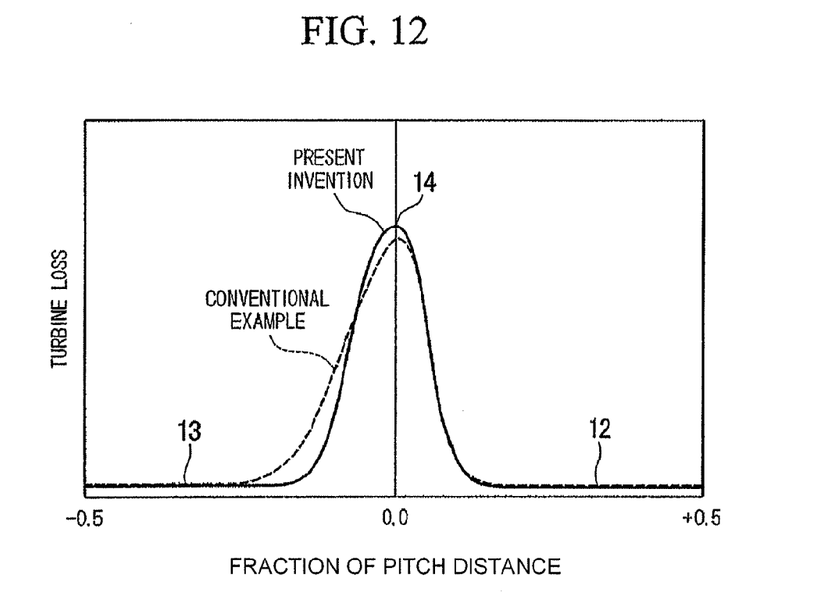
FIG. 12 shows an improvement effect on a turbine loss in the blade in accordance with the embodiment of the present invention.
Figure 13:
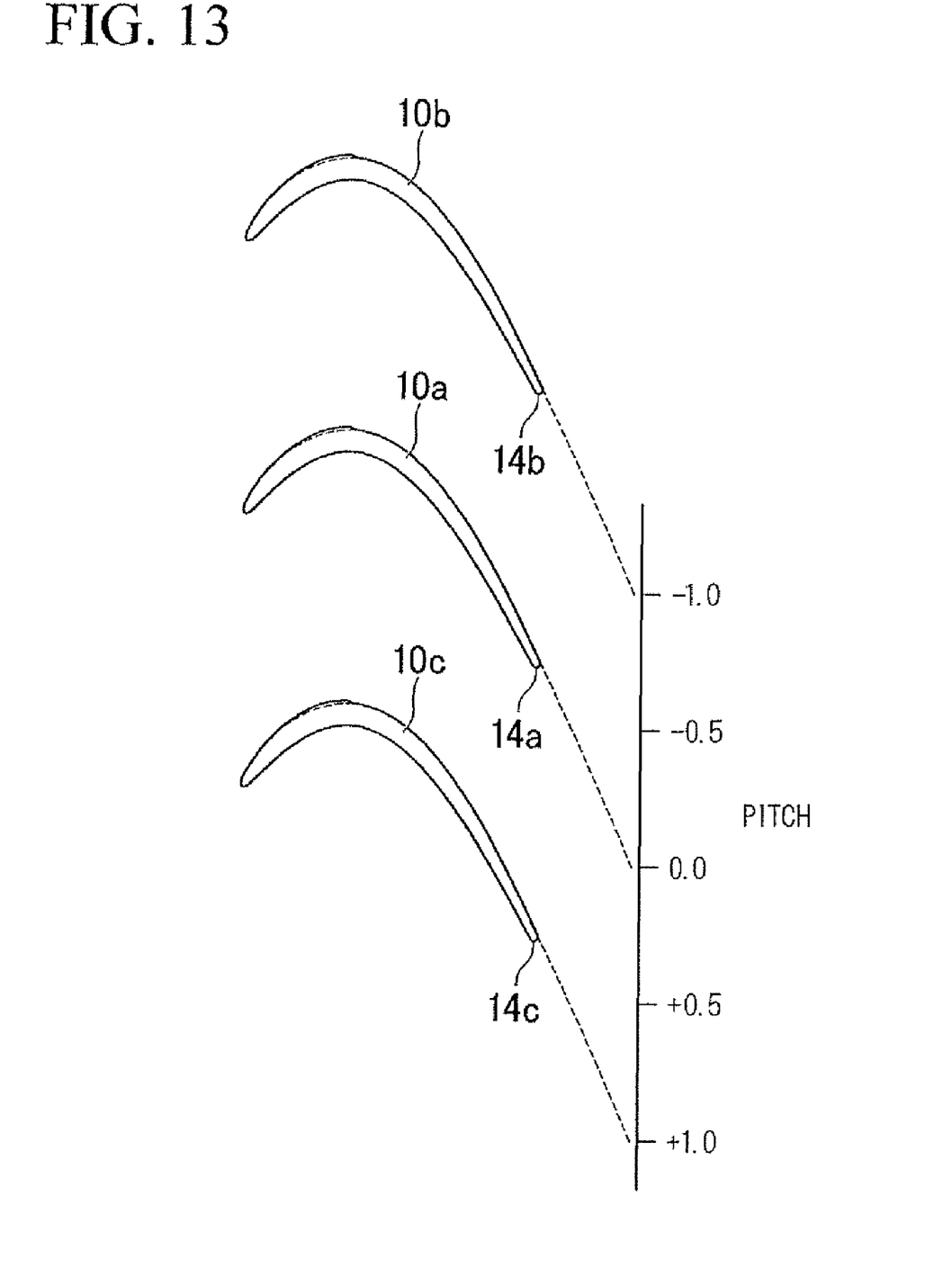
FIG. 13 shows a fraction of pitch distance shown in the horizontal axis of FIG. 12.

FIG. 12 shows graphs showing the turbine loss of the blade 10 in accordance with the embodiment of the present invention and the blade in accordance with the conventional example. FIG. 13 shows a fraction of pitch distance of the second suction surface 13b at the trailing edge portion 14 of blade 10 which is also shown in the horizontal axis of FIG. 12. That is, the fraction of pitch distance shown in the horizontal axis of FIG. 12 is defined so that, as shown in FIG. 13, when a second suction surface 13b at a trailing edge portion 14a of one blade 10a is defined as being at a location of 0.0 pitch, a second suction surface 13 b at a trailing edge portion 14b of another blade 10b adjacent to a suction surface of the blade 10a is defined as being at a location of −1.0 pitch relative to the blade 10a, and a second suction surface 13b at a trailing edge portion 14c of another blade 10c adjacent to a pressure surface of the blade 10a is defined as being at a location of +1.0 pitch relative to the blade 10a. Also, an intermediate position between the second suction surface 13b at the trailing edge portion 14a of the blade 10a and the second suction surface 13b at the trailing edge portion 14b of the blade 10b is defined as being at a fraction of pitch distance of as −0.5 pitch and an intermediate position between the second suction surface 13b at the trailing edge portion 14a of the blade 10a and the second suction surface 13b at the trailing edge portion 14c of the blade 10c is defined as being at a fraction of pitch distance of +0.5 pitch.

As obtained from FIG. 12, in the blade 10 in accordance with the embodiment of the present invention, the turbine loss is improved by approximately 10% compared to the blade in accordance with the conventional example. In the graph in FIG. 12, when total area of the turbine loss is small, the turbine loss is small which means the turbine loss is improved. In the blade 10 in accordance with the embodiment of the present invention, the laminar separation on the suction surface 13 is prevented, the fluid flow on the suction surface 13 is smooth, a pressure loss on a blade exit on the suction surface 13 is small, and the turbine loss is improved by approximately 10% as shown in the graph of FIG. 12.

INDUSTRIAL APPLICABILITY

A blade is provided for preventing a laminar separation from occurring on a trailing edge portion of a suction surface without causing restrictions on manufacturing conditions.

What is claimed is:
1. A blade comprising:
a leading edge portion, which is where fluid flows in;
a pressure surface which is a concave curve shape concaved along a direction fluid flows;
a suction surface which is a convex curve shape convexed along the direction the fluid flows; and
a trailing edge portion, which is where the fluid flows out, wherein
a disturbance addition portion is provided on the suction surface closer to the leading edge portion than a maximum velocity point, where the flow velocity of the fluid is maximized on the suction surface, the disturbance addition portion disturbing a laminar flow on the suction surface and converting the laminar flow to a turbulent flow, wherein the disturbance addition portion is concaved in a thickness direction of the blade formed by the pressure surface and the suction surface, and forms a step portion extending along the direction fluid flows, and wherein the suction surface includes a first suction surface and a second suction surface, the first suction surface, extending from the leading edge portion to the step portion, and the second suction surface, extending from the step portion to the trailing edge portion, being connected via the step portion, the second suction surface is located closer to the pressure surface than an imaginary curve, which is produced when the first suction surface is extended to the trailing edge portion above the second suction surface, and the disturbance addition portion includes a connection portion bordering on the first suction surface at the step portion end of the first suction surface, the connection portion being a convex curve convexed along the direction the fluid flows.

\* \* \* \* \*